Feb. 3, 1948. M. P. HOFMANN 2,435,216
APPARATUS FOR MIXING
Filed April 17, 1943 3 Sheets-Sheet 1

INVENTOR.
MAXIMILIAN P. HOFMANN
BY
Oberlin, Limbach & Day.
ATTORNEYS

Feb. 3, 1948.   M. P. HOFMANN   2,435,216
APPARATUS FOR MIXING
Filed April 17, 1943   3 Sheets-Sheet 2

INVENTOR.
MAXIMILIAN P. HOFMANN
BY
Oberlin, Limbach & Day
ATTORNEYS

Feb. 3, 1948. M. P. HOFMANN 2,435,216
APPARATUS FOR MIXING
Filed April 17, 1943 3 Sheets-Sheet 3

INVENTOR.
MAXIMILIAN P. HOFMANN
BY
Oberlin, Limbach & Day
ATTORNEYS

Patented Feb. 3, 1948

2,435,216

UNITED STATES PATENT OFFICE 2,435,216

APPARATUS FOR MIXING

Maximilian P. Hofmann, Bay Village, Ohio, assignor to The C. O. Bartlett and Snow Company, Cleveland, Ohio, a corporation of Ohio Application April 17, 1943, Serial No. 483,415

14 Claims. (Cl. 259—7)

1

This application is a continuation-in-part of my copending application, Serial No. 376,668, filed January 30, 1941, now Patent No. 2,321,599, dated June 15, 1943.

This invention is, as indicated, concerned with apparatus for mixing, and is primarily related to such apparatus which are characterized by the fact that the flowable and generally predominantly liquid material is, in the first stage, subjected to rather high pressures, specifically by means of a centrifugal pump, and then such pressure utilized to cause the material to be treated to flow between relatively closely spaced relatively moving solid surfaces, the direction of flow in such second stage being counter to the direction in which the material in said stage is urged by centrifugal force so that said second treating stage is at all times maintained in a filled condition.

The present invention is particularly concerned with the form and arrangement of the cooperating surfaces which define said second stage.

This invention is also concerned with the introduction of a certain portion of the material to be treated at that stage of the process wherein the material under treatment, or at least a portion thereof, is under substantial pressure, thus making possible the carrying on of a wide variety of processes with a wide variety of materials.

The principal objects of this invention are the attainment of the foregoing ends.

Other objects of my invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings—

Fig. 1 is a transverse sectional view of a vertical plane through one form of apparatus embodying the principles of this invention;

Figs. 2, 3, and 4 are fragmentary sectional views similar to Fig. 1, respectively showing modifications in a portion of the apparatus illustrated in Fig. 1;

2

Figure 4:
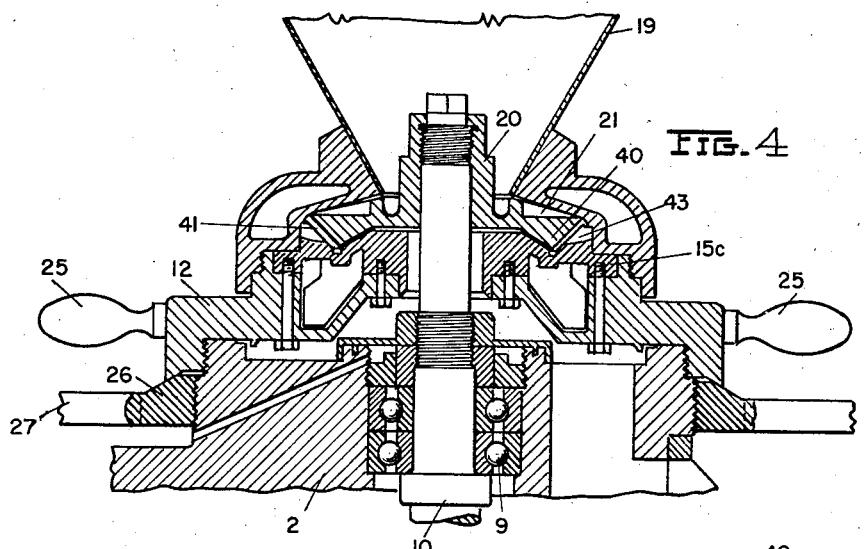
Figure 7:
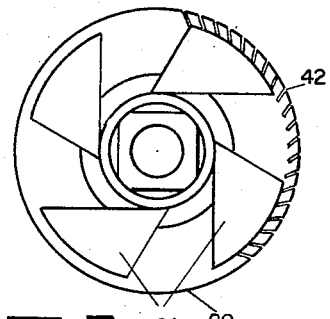
Figure 8:
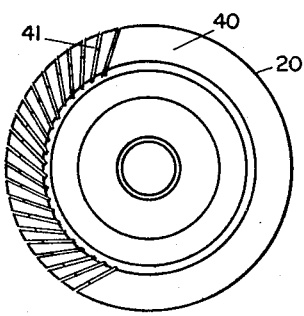
Figure 9:
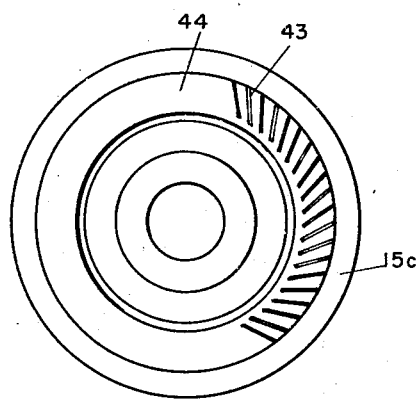

Fig. 7 is a top plan view of the rotor element of the structure illustrated in Fig. 4;

Fig. 8 is a bottom plan view of the rotor of the structure illustrated in Fig. 4; and Fig. 9 is a top plan view of the stator of the structure illustrated in Fig. 4.

Figure 1:
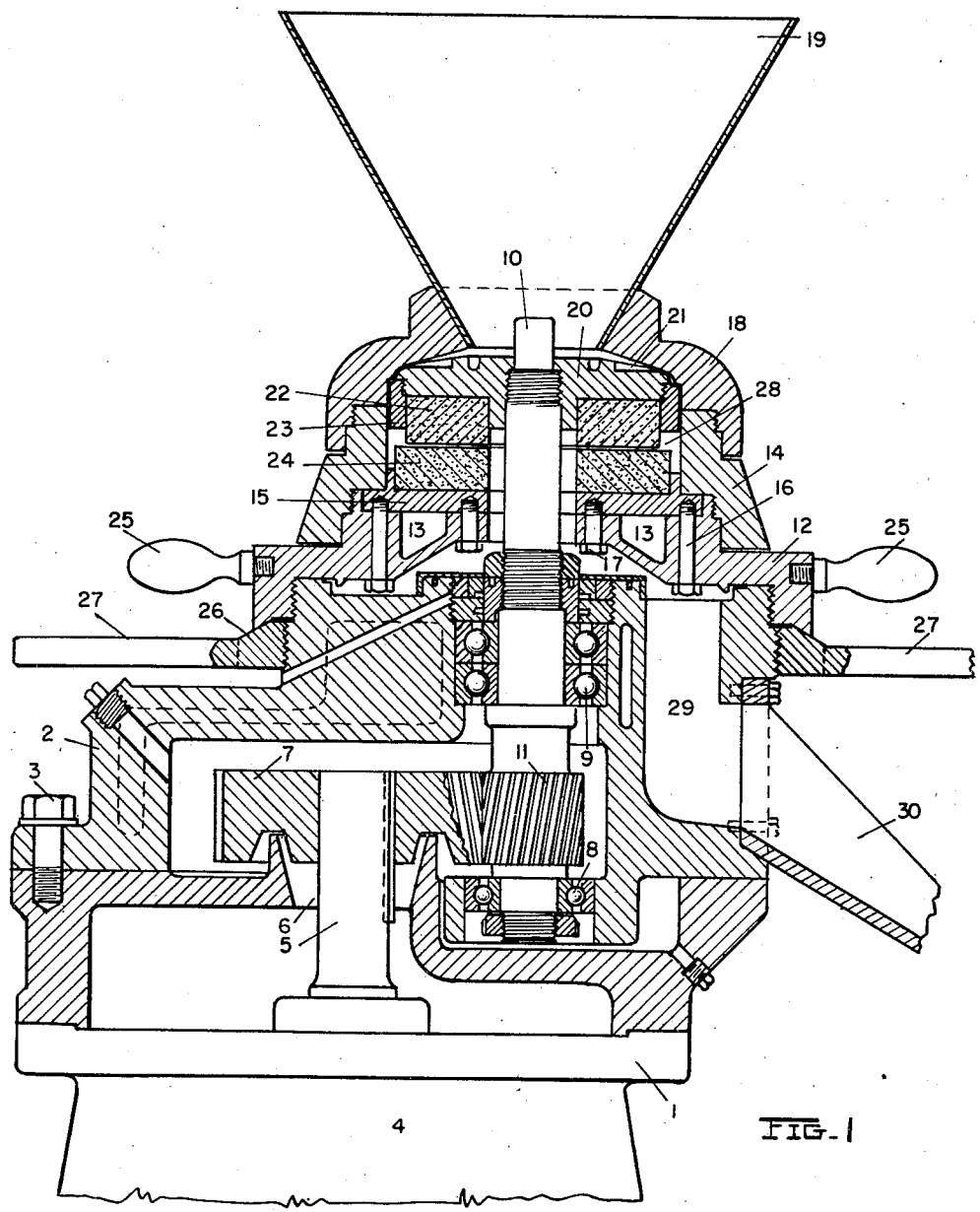

Referring now more specifically to the drawings, and more especially to Fig. 1, the structure here illustrated is the complete device incorporating one of the several modifications of rotor and stator structure comprising this invention. The modifications illustrated in Figs. 2 to 9 are all adapted for use in the assembly illustrated in Fig. 1, and accordingly like reference characters will be employed to designate like parts in the several figures.

The apparatus generally consists of a base 1 to which is removably secured an intermediate member 2 by means such as a plurality of bolts 3, only one of which is shown in Fig. 1.

Since all of the principal parts shown in cross-section in Fig. 1 are substantially cylindrical, it is believed unnecessary to burden the disclosure with additional figures showing cross-sections of the structure in planes at right angles to those illustrated.

The base member 1 in the area generally indicated at 4 will house a suitable prime mover such as an electric motor, the drive shaft 5 of which is illustrated as extending upwardly through the opening 6 in the upper portion of the base 1, and such drive shaft 5 has a driving pinion 7 keyed thereto. The intermediate portion 2 of the structure is provided with spaced anti-friction bearings 8 and 9 which rotatably support a driven shaft 10. A gear 11, either keyed to or formed integrally on the shaft 10, is in mesh with the driving pinion 7.

A stator supporting member 12 is threadably secured to the upper end of the intermediate member 2. The inner portion of the member 12 is provided with cored openings 13 for the passage of a temperature modifying medium therethrough.

An annular member 14 is threadably secured to the member 12 and such member 14 serves as a spacing means between the members 12 and 18. By providing a plurality of interchangeable members 14 of different axial dimensions, the apparatus may be made to accommodate a corresponding number of different rotor stator assemblies having correspondingly different axial dimensions.

To the upper end of the annulus 14 there is threadably secured a dome member 18 which is centrally provided with an inlet opening in which is mounted the hopper 19 into which the material to be treated is fed.

The upper end of the shaft 10 has a rotor 20 secured thereto. While the connection between the rotor 20 and shaft 10 is shown as a threaded joint, nevertheless, other well-known expedients may be employed for the purpose of connecting the two parts.

The present invention is, as previously indicated, concerned largely with modifications of the rotor and stator assembly, or more particularly, the cooperating surfaces thereof. In this connection it will be observed that in the appended claims the entire assembly which comprises parts 12, 14, 15, and 18 are inclusively defined as the stator portion of the apparatus, and the element 20, and its associated moving parts, is referred to as the rotor.

Figure 5:
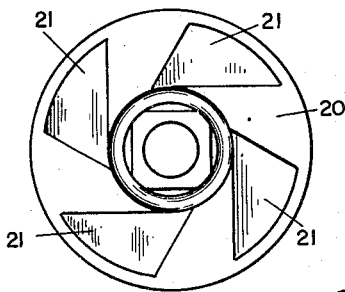
Fig. 5 is a plan view of the rotor employed in each of Figs. 2 and 3.

In the modification of the invention illustrated in Fig. 1, the upper face of the rotor 20, illustrated in Fig. 5, is provided with a plurality of impeller blades 21 formed by cutting away a portion of the upper surface of the rotor. The modification illustrated in Fig. 1 is characterized by the fact that the opposed faces of the rotor and stator respectively, through which the material under treatment is caused to flow during the second stage of the process as aforesaid, comprise abrasive elements, the abrasive element 22 being secured to the rotor by means of a threaded annulus 23; and the abrasive element 24 being carried by the member 15 of the stator.

The handles 25 on the member 12 are merely for the purpose of facilitating the threading of such element onto the intermediate member 2. Also threaded on the intermediate member 2, below the member 12, is an annulus 26 which functions as a jam nut and is provided with actuating handles 27 on opposite sides thereof.

The material passage through the apparatus is first downwardly through the hopper 19 where it is brought into engagement with the impeller blades 21 of the rotor 20. These function as a centrifugal pump, causing the material to be forced outwardly into the space between the rotor and the member 18. Thence, the material flows downwardly between the relatively narrow space between members 18 and 23; then filling the annular space 28 surrounding the parting plane between the abrasive elements 22 and 24. The pressure built up in this annular space 28, under the influence of the centrifugal pump as described, causes the material to be forced radially inwardly between the opposed faces of the abrasive elements, after which it is permitted to discharge axially downwardly into the passage 29, from which it is discharged by means of the delivery chute 30.

There are many details of construction, such as passages for the introduction of lubricants and temperature modifying media, all of which are believed to be sufficiently apparent from the drawings so that they need not be described in greater detail. It is also within the contemplation of my invention to provide means for modifying the temperature of the material fed to the apparatus. This can be accomplished by neither placing a heating coil in the hopper 19, or by having the hopper 19 provided with cored walls through which a temperature modifying medium may be circulated.

From the foregoing description of Fig. 1, it will be observed that the apparatus of the present invention comprises a rotor member or assembly having a disk-like projection 20 thereon having opposed faces, the first being the upper face on which the impeller blades are mounted, and the second being the lower face of the abrasive element 22. The stator comprising the combination of elements 12, 14, 15, 18, and 24 embrace said rotor in close proximity to the opposite faces of said disk-like projection. The closely spaced relationship between the upper face of the rotor and the member 18, supplemented by the provision of the projections 21, makes the space between the first face of the rotor and adjacent stator parts a centrifugal pump which places the material under treatment under sufficiently high pressure so as to cause the same to flow through the remainder of the treating phases to which it is subjected.

Figure 2:
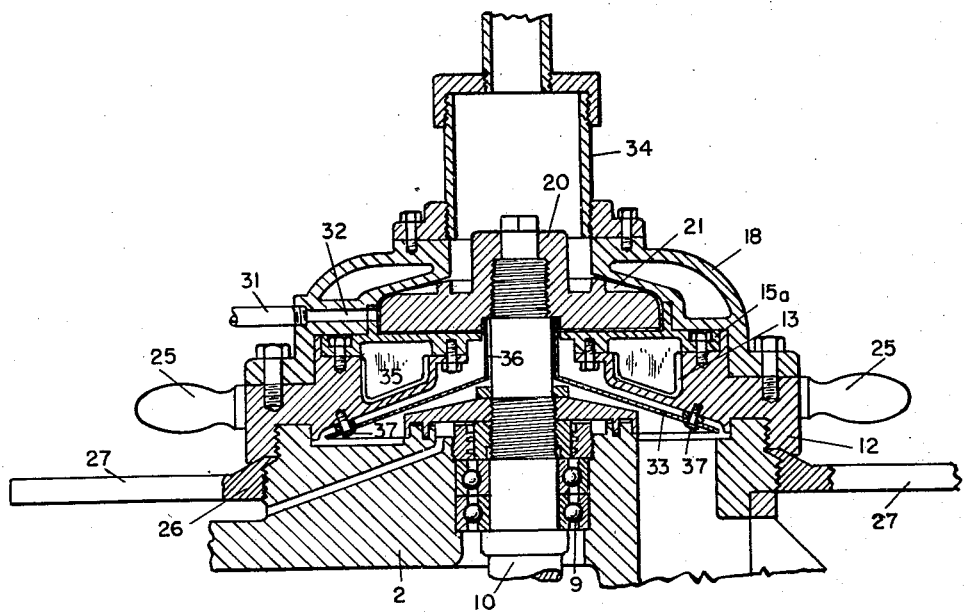

The apparatus illustrated in Fig. 2 is a modification of the apparatus illustrated in Fig. 1 in the following particulars:

(1) In the form of the second or lower face and periphery of the stator;
(2) In the form of the stator element 15a;
(3) In the provision of a conduit 31 and associated passage 32 leading to the space between the stator and rotor at the periphery of the latter; and
(4) In the provision of the baffle member 33.

These four distinctive features which characterize the structure of Fig. 2 will be taken up for consideration in the order given above.

The rotor 20 of Fig. 2 has its upper face provided with impeller means similarly to the rotor of Fig. 1. The second or lower face of the rotor 20 of Fig. 2 is a flat finish metallic surface instead of the abrasive element which characterized Fig. 1. Thus, the structure of Fig. 2 is more adapted for use in blending fluids, rather than for the purposes of an attraction mill which is one of the principal functions of the structure of Fig. 1.

Similarly, the stator element 15a in that portion which lies adjacent the rotor comprises flat finish metallic surfaces for the same reasons. The material to be fed to the upper portion of the rotor 20 is, in this case, introduced through a pressure connection generally indicated at 34, instead of through the open hopper 19 of Fig. 1.

The provision of an auxiliary feed conduit 31 leading, by means of the passage 32, to the space surrounding the periphery of the stator makes possible the carrying on of processes which may not be performed by any of the other illustrated modifications. The apparatus characterized by this auxiliary feed 31 makes possible the carrying on of processes such as the following:

A preliminary blending of two components simultaneously fed to the apparatus through the pressure connection 34 may be accomplished by means of the centrifugal pump and the forcing of such mixture through the narrow space between the rotor and stator leading to the periphery of the rotor, whereupon, a third phase may be introduced and the final blending accomplished as the material flows radially inwardly between the opposed flat faces of the rotor and stator.

Another process which may be carried on by the apparatus of Fig. 2 is the incorporation of a gas or volatile liquid in the material under treatment.

Many other processes which may be performed by the apparatus of Fig. 2 will be evident to those skilled in the art.

At this point it may be well to mention that the material introduced through the conduit 31 must be fed in at a pressure at least substantially as great as that generated by the centrifugal pump. Accordingly, in any commercial installation, suitable pressure regulating devices should be provided for use in conjunction with a conduit 31, but since the same are generally available, and their construction well-known to those familiar with the art, and since their construction forms no part of the present invention, they have not been illustrated.

Figure 6:
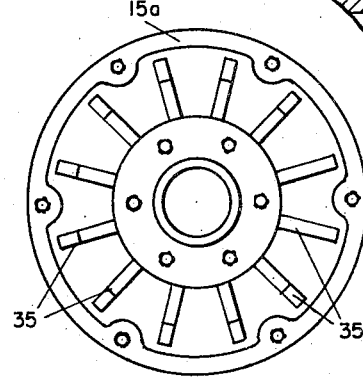
Fig. 6 is a bottom plan view of the stator parts forming an element of each of the structures illustrated in Figs. 2, 3, and 4.

The third feature difference between the structures of Figs. 1 and 2 resides in the provision on the lower face of the stator plate 15a of a plurality of ribs 35, the form and arrangement of which is most clearly illustrated in Fig. 6, the same projecting into the space 13 through which the temperature modifying medium is circulated. These vanes or projections 35 are provided for the purpose of increasing the rate of heat exchange between the stator plate 15a and the temperature modifying medium circulated through the opening 13.

The fourth principal difference between the constructions of Figs. 1 and 2 resides in the provision in the structure of the latter figure of a baffle member 33 which is in the form of a truncated cone provided with a cylindrical projection 36 leading from the apex of the cone into the discharge opening which leads from the space between the second or lower face of the rotor and the adjacent face of the stator. This baffle 33 is stationary and is secured to the member 12 by means of a plurality of studs 37.

I have found that by thus projecting a stationary collecting and discharge member into close proximity to the point where the material is discharged from the second treating stage, the amount of frothing is materially decreased. Also, such baffle provides additional means for the purpose of insuring that the material under treatment does not come in contact with the bearings 9 and the lubricant which must necessarily be present on such bearings.

Figure 3:
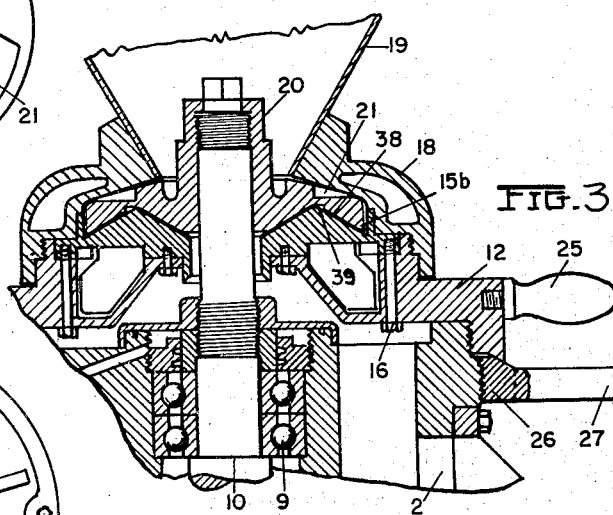

The structure illustrated in Fig. 3 differs from the structure illustrated in Figs. 1 and 2 in the formation of the complementary faces on the rotor and stator, the space between which the material under treatment flows during the second stage of the treating process. The rotor 20 of Fig. 3 is substantially like the rotor 20 of Fig. 2, excepting that on its under-face 38 there is provided intermediately of the inner and outer boundaries of its active face an annular groove with preferably substantially flat sides, and the adjacent face of the stator element 15b is provided with a corresponding annular ridge 39. During the construction of the parts, and more particularly the rotor member 20, and the stator member 15b, the parts should first be rough-formed and then "ground-in" so as to insure that when the parts are assembled in slightly spaced relation, the space between the rotor and stator in the area of these complementary grooves and ridges will be of uniform dimension.

The structure illustrated in Figs. 4 to 9, excepting for the fact that the arrangement of the ribs and grooves on the stator and rotor are reversed, is similar to that illustrated in Fig. 3, excepting that the outer face of the ridge 40 on the rotor is provided with a plurality of flutes 41, the form and arrangement of which are most clearly illustrated in Fig. 8. It will be observed that these flutes are not truly radial, but are, instead, inclined, and preferably inclined in the direction of rotation so as to exert a scooping action on the material with which they come in contact.

While the preferred embodiment of the invention as illustrated in Figs. 7 and 8 shows the rotor provided with both axially extending slots 42 and radially extending slots 41 formed on its lower face, it is, nevertheless, within the contemplation of my invention to use either the radial or axial slots alone, without the use of the other. Similarly, the radial slots 41 may be inclined in a direction opposite to the direction of inclination shown in Fig. 8.

As most clearly illustrated in Fig. 7, the periphery of the rotor 20 is provided with a plurality of slots or flutes most clearly illustrated at 42 in Fig. 7.

The stator plate 15c of the construction illustrated in Fig. 4 is also provided with a plurality of flutes 43 formed on the outer face 44 of the groove in which the rotor operates. The provision of the flutes in both the rotor and stator elements of the structure illustrated in Figs. 4 to 9 makes it possible to pass through the mill fluid suspensions of solid materials in which such solids are not only of substantial size, but also in which the solids are a substantial portion of the mass. The suspension placed under pressure by the centrifugal pump is first engaged by the slots or flutes formed on the periphery of the rotor. These serve to preliminarily reduce the particle size of the solids so that the suspension may then flow through the space defined by the lower face of the rotor and the upper face of the stator, which latter space is bounded by flutes formed in both elements. The provision of the flutes in the complementary outer faces of the rotor and stator provides an area in which the preliminarily reduced particles of solid material are subjected to tremendous hydraulic shear, and accordingly, wherein such particle size is further and very substantially reduced. The reduction in particle size affected by this area of the second zone of treatment is sufficient so as to permit the particles to pass into the radial inward space between the rotor and stator where no flutes are provided, but where again hydraulic shear in the film or layer of material under treatment is relied upon for the purpose of reducing the particle size to the final and desired value which in most cases will be colloidal.

By providing the complementary faces of the rotor and stator with complementary ribs and grooves of the substantial size illustrated in Figs. 3 and 4 has been found to increase the uniform distribution of the film of material under treatment in this stage of the apparatus, so that more consistently uniform results are generally secured, especially with certain types of material.

Other modes of applying the principle of the invention may be employed, change being made as regards the details described, provided the features stated in any of the following claims or the equivalent of such be employed.

I, therefore, particularly point out and distinctly claim as my invention:

1. In apparatus of the character described, the combination of a rotor member having a disc-like projection thereon having opposed faces and a stator embracing said rotor in close proximity to the opposite faces of said disc-like portion, said assembly provided with an inlet centrally of the first face of said disc-like projection and an outlet centrally of the second face of said disc-like projection, a plurality of impeller means carried by the said first face and so arranged as to provide therebetween a plurality of radially extending passages and to thus constitute a centrifugal pump in the space between said first face and adjacent stator parts, and said second face and adjacent stator parts comprising complementary coniform surfaces and arranged in such closely spaced relation as to constitute a treating stage for the material caused to flow therethrough under the influence of said centrifugal pump.

2. In apparatus of the character described, the combination of a rotor member having a disc-like projection thereon having opposed faces and a stator embracing said rotor in close proximity to the opposite faces of said disc-like portion, said assembly provided with an inlet centrally of the first face of said disc-like projection and an outlet centrally of the second face of said disc-like projection, a plurality of impeller means carried by the said first face and so arranged as to provide therebetween a plurality of radially extending passages and to thus constitute a centrifugal pump in the space between said first face and adjacent stator parts, and said second face and adjacent stator parts being so formed as to define an annular space with radially contiguous increments thereof oppositely inclined with respect to a plane normal to the axis of rotation of said rotor and arranged in such closely spaced relation as to constitute a treating stage for the material caused to flow therethrough under the influence of said centrifugal pump.

3. In apparatus of the character described, the combination of a rotor member having a disc-like projection thereon having opposed faces and a stator embracing said rotor in close proximity to the opposite faces of said disc-like portion, said assembly provided with an inlet centrally of the first face of said disc-like projection and an outlet centrally of the second face of said disc-like projection, a plurality of impeller means carried by the said first face and so arranged as to provide therebetween a plurality of radially extending passages and to thus constitute a centrifugal pump in the space between said first face and adjacent stator parts, and said second face and adjacent stator parts arranged in such closely spaced relation as to constitute a treating stage for the material caused to flow therethrough under the influence of said centrifugal pump, at least one of the surfaces definining said treating stage being provided with a plurality of substantially radially extending flutes.

4. In apparatus of the character described, the combination of a rotor member having a disc-like projection thereon having opposed faces and a stator embracing said rotor in close proximity to the opposite faces of said disc-like portion, said assembly provided with an inlet centrally of the first face of said disc-like projection and an outlet centrally of the second face of said disc-like projection, a plurality of impeller means carried by the said first face and so arranged as to provide therebetween a plurality of radially extending passages and to thus constitute a centrifugal pump in the space between said first face and adjacent stator parts, and said second face and adjacent stator parts arranged in such closely spaced relation as to constitute a treating stage for the material caused to flow therethrough under the influence of said centrifugal pump, both of the surfaces defining said treating stage being provided with a plurality of substantially radially extending flutes.

5. In apparatus of the character described, the combination of a rotor member having a disc-like projection thereon having opposed faces and a stator embracing said rotor in close proximity to the opposite faces of said disc-like portion, said assembly provided with an inlet centrally of the first face of said disc-like projection and an outlet centrally of the second face of said disc-like projection, a plurality of impeller means carried by the said first face and so arranged as to provide therebetween a plurality of radially extending passages and to thus constitute a centrifugal pump in the space between said first face and adjacent stator parts, and said second face and adjacent stator parts arranged in such closely spaced relation as to constitute a treating stage for the material caused to flow therethrough under the influence of said centrifugal pump, at least one of the surfaces defining said treating stage being provided with a plurality of substantially radially extending flutes inclined in the direction of rotation of the rotor.

6. In apparatus of the character described, the combination of a rotor member having a disc-like projection thereon having opposed faces and a stator embracing said rotor in close proximity to the opposite faces of said disc-like portion, said assembly provided with an inlet centrally of the first face of said disc-like projection and an outlet centrally of the second face of said disc-like projection, a plurality of impeller means carried by the said first face and so arranged as to provide therebetween a plurality of radially extending passages and to thus constitute a centrifugal pump in the space between said first face and adjacent stator parts, and said second face and adjacent stator parts being so formed as to define an annular space with radially contiguous increments thereof oppositely inclined with respect to a plane normal to the axis of rotation of said rotor and arranged in such closely spaced relation as to constitute a treating stage for the material caused to flow therethrough under the influence of said centrifugal pump, and at least one of the surfaces defining at least one of said increments provided with a plurality of substantially radially extending flutes.

7. In apparatus of the character described, the combination of a rotor member having a disc-like projection thereon having opposed faces and a stator embracing said rotor in close proximity to the opposite faces of said disc-like portion, said assembly provided with an inlet centrally of the first face of said disc-like projection and an outlet centrally of the second face of said disc-like projection, a plurality of impeller means carried by the said first face and so arranged as to provide therebetween a plurality of radially extending passages and to thus constitute a centrifugal pump in the space between said first face and adjacent stator parts, and said second face and adjacent stator parts being so formed as to define an annular space with radially contiguous increments thereof oppositely inclined with respect to a plane normal to the axis of rotation of said rotor and arranged in such closely spaced relation as to constitute a treating stage for the material caused to flow therethrough under the influence of said centrifugal pump, and that portion of at least one of the surfaces defining the outermost of said increments provided with a plurality of substantially radially extending flutes.

8. In apparatus of the character described, the combination of a rotor member having a disc-like projection thereon having opposed faces and a stator embracing said rotor in close proximity to the opposite faces of said disc-like portion, said assembly provided with an inlet centrally of the first face of said disc-like projection and an outlet centrally of the second face of said disc-like projection, a plurality of impeller means carried by the said first face and so arranged as to provide therebetween a plurality of radially extending passages and to thus constitute a centrifugal pump in the space between said first face and adjacent stator parts, and said second face and adjacent stator parts being so formed as to define an annular space with radially contiguous increments thereof oppositely inclined with respect to a plane normal to the axis of rotation of said rotor and arranged in such closely spaced relation as to constitute a treating stage for the material caused to flow therethrough under the influence of said centrifugal pump, and that portion of both the surfaces defining the outermost of said increments provided with a plurality of substantially radially extending flutes.

9. In apparatus of the character described, the combination of a rotor member having a disc-like projection thereon having opposed faces and a stator embracing said rotor in close proximity to the opposite faces of said disc-like portion, said assembly provided with an inlet centrally of the first face of said disc-like projection and an outlet centrally of the second face of said disc-like projection, a plurality of impeller means carried by the said first face and so arranged as to provide therebetween a plurality of radially extending passages and to thus constitute a centrifugal pump in the space between said first face and adjacent stator parts, and said second face and adjacent stator parts arranged in such closely spaced relation as to constitute a treating stage for the material caused to flow therethrough under the influence of said centrifugal pump, the peripheral portion of said disc-like projection being provided with axially extending flutes.

10. In apparatus of the character described, the combination of a rotor member having a disc-like projection thereon having opposed faces and a stator embracing said rotor in close proximity to the opposite faces of said disc-like portion, said assembly provided with an inlet centrally of the first face of said disc-like projection and an outlet centrally of the second face of said disc-like projection, a plurality of impeller means carried by the said first face and so arranged as to provide therebetween a plurality of radially extending passages and to thus constitute a centrifugal pump in the space between said first face and adjacent stator parts, and said second face and adjacent stator parts comprising complementary coniform surfaces and arranged in such closely spaced relation as to constitute a treating stage for the material caused to flow therethrough under the influence of said centrifugal pump, the peripheral portion of said disc-like projection being provided with axially extending flutes.

11. In apparatus of the character described, the combination of a rotor member having a disc-like projection thereon having opposed faces and a stator embracing said rotor in close proximity to the opposite faces of said disc-like portion, said assembly provided with an inlet centrally of the first face of said disc-like projection and an outlet centrally of the second face of said disc-like projection, a plurality of impeller means carried by the said first face and so arranged as to provide therebetween a plurality of radially extending passages and to thus constitute a centrifugal pump in the space between said first face and adjacent stator parts, and said second face and adjacent stator parts being so formed as to define an annular space with radially contiguous increments thereof oppositely inclined with respect to a plane normal to the axis of rotation of said rotor and arranged in such closely spaced relation as to constitute a treating stage for the material caused to flow therethrough under the influence of said centrifugal pump, the peripheral portion of said disc-like projection being provided with axially extending flutes.

12. In apparatus of the character described, the combination of a rotor member having a disc-like projection thereon having opposed faces and a stator embracing said rotor in close proximity to the opposite faces of said disc-like portion, said assembly provided with an inlet centrally of the first face of said disc-like projection and an outlet centrally of the second face of said disc-like projection, a plurality of impeller means carried by the said first face and so arranged as to provide therebetween a plurality of radially extending passages and to thus constitute a centrifugal pump in the space between said first face and adjacent stator parts, and said second face and adjacent stator parts arranged in such closely spaced relation as to constitute a treating stage for the material caused to flow therethrough under the influence of said centrifugal pump, at least one of the surfaces defining said treating stage being provided with a plurality of substantially radially extending flutes and the peripheral portion of said disc-like projection being provided with axially extending flutes.

13. In apparatus of the character described, the combination of a rotor member having a disc-like projection thereon having opposed faces and a stator embracing said rotor in close proximity to the opposite faces of said disc-like portion, said assembly provided with an inlet centrally of the first face of said disc-like projection and an outlet centrally of the second face of said disc-like projection, a plurality of impeller means carried by the said first face and so arranged as to provide therebetween a plurality of radially extending passages and to thus constitute a centrifugal pump in the space between said first face and adjacent stator parts, and said second face and adjacent stator parts arranged in such closely spaced relation as to constitute a treating state for the material caused to flow therethrough under the influence of said centrifugal pump, the peripheral portion of said disc-like projection being provided with axially extending flutes, and said second face being provided with a plurality of radially extending flutes terminating adjacent said axially extending flutes.

14. In apparatus of the character described, the combination of a rotor member having a disc-ilke projection thereon having opposed faces and a stator embracing said rotor in close proximity to the opposite faces of said disc-like portion, said assembly provided with an inlet centrally of the first face of said disc-like projection and an outlet centrally of the second face of said disc-like projection, a plurality of impeller means carried by the said first face and so arranged as to provide therebetween a plurality of radially extending passages and to thus constitute a centrifugal pump in the space between said first face and adjacent stator parts, and said second face and adjacent stator parts arranged in such closely spaced relation as to constitute a treating stage for the material caused to flow therethrough under the influence of said centrifugal pump, and a truncated cone adjacent said outlet provided with a cylindrical projection from the apex thereof extending into said outlet.

MAXIMILIAN P. HOFMANN.

REFERENCES CITED

The following references are of record in the file of this patent:

UNITED STATES PATENTS

| Number | Name | Date |
|---|---|---|
| 1,771,321 | Snow | July 22, 1930 |
| 1,848,100 | Benner et al. | Mar. 8, 1932 |
| 1,489,786 | Povey et al. | Apr. 8, 1924 |
| 1,935,884 | Loomis et al. | Nov. 21, 1933 |
| 2,083,171 | Nester | June 8, 1937 |
| 2,169,338 | Ditto | Aug. 15, 1939 |
| 1,685,115 | Adams | Sept. 25, 1928 |
| 1,670,593 | Miller | May 22, 1928 |
| 1,885,283 | Ostermann | Nov. 1, 1932 |
| 2,245,112 | McLean | June 10, 1941 |
| 2,267,341 | Schmidt | Dec. 23, 1941 |
| 2,321,599 | Hofmann | June 15, 1942 |
| 1,711,154 | Mickal | Apr. 30, 1929 |

FOREIGN PATENTS

| Number | Country | Date |
|---|---|---|
| 806,149 | France | Sept. 14, 1936 |